United States Patent
Yu et al.

(10) Patent No.: US 9,381,777 B2
(45) Date of Patent: Jul. 5, 2016

(54) SIGNAL TRANSPONDER TRANSCEIVING SIGNALS USING DIFFERENT COMMUNICATION PROTOCOLS AND METHOD FOR TRANSCEIVING SIGNALS USING DIFFERENT COMMUNICATION PROTOCOLS

(71) Applicant: Orange Electronic Co., Ltd., Taichung (TW)

(72) Inventors: Hung-Chih Yu, Taichung (TW); Shih-Hsin Chang, Taichung (TW); Chin-Yao Hsu, Taichung (TW)

(73) Assignee: Orange Electronics Co., Ltd., Taichung (TW)

( * ) Notice: Subject to any disclaimer, the term of this patent is extended or adjusted under 35 U.S.C. 154(b) by 0 days.

(21) Appl. No.: 14/444,348

(22) Filed: Jul. 28, 2014

(65) Prior Publication Data

US 2015/0042464 A1 Feb. 12, 2015

(30) Foreign Application Priority Data

Aug. 8, 2013 (TW) .............................. 102128438 A

(51) Int. Cl.
*B60C 23/00* (2006.01)
*B60C 23/04* (2006.01)

(52) U.S. Cl.
CPC ......... *B60C 23/0433* (2013.01); *B60C 23/0415* (2013.01); *B60C 23/0437* (2013.01); *B60C 23/0444* (2013.01)

(58) Field of Classification Search
CPC ............ B60C 23/0415; B60C 23/0437; B60C 23/0444; B60C 23/0433; H01Q 1/2241
USPC .............. 340/442–449; 73/146, 146.3, 146.5; 116/34 R, 34 A, 34 B
See application file for complete search history.

(56) References Cited

U.S. PATENT DOCUMENTS

| 6,469,621 | B1 * | 10/2002 | Vredevoogd | B60C 23/0408 340/442 |
| 7,243,535 | B2 * | 7/2007 | Shimura | B60C 23/0408 73/146 |
| 7,696,902 | B2 * | 4/2010 | Ichikawa | B60C 23/0413 340/426.33 |
| 2011/0140876 | A1 * | 6/2011 | Deniau | B60C 23/0408 340/445 |
| 2012/0223828 | A1 * | 9/2012 | Amato | B60C 23/0433 340/447 |

FOREIGN PATENT DOCUMENTS

JP 2005141553 A 6/2005
JP 2010533612 A 10/2010

OTHER PUBLICATIONS

Japanese Office Action to corresponding patent application No. 2014-160688, dated Sep. 27, 2015.

* cited by examiner

*Primary Examiner* — Anh V La
(74) *Attorney, Agent, or Firm* — C. G. Mersereau; Nikolai & Mersereau, P.A.

(57) ABSTRACT

A signal transponder transceiving signals using different communication protocols has a control module, a receiving module and a transmitting module. The control module is electrically connected to the receiving module and the transmitting module, is built in with multiple communication protocols, decodes a tire pressure signal transmitted from and encoded by an external tire pressure sensor with one of the communication protocols, encodes the decoded information to a new tire pressure signal, and further transmits the new tire pressure signal to a tire pressure receiver. Accordingly, there is no failure in decoding and transmissions and cost increase when the signal transponder communicates with tire pressure sensors and a tire pressure receiver using two different communication protocols.

14 Claims, 5 Drawing Sheets

SIGNAL TRANSPONDER TRANSCEIVING SIGNALS USING DIFFERENT COMMUNICATION PROTOCOLS AND METHOD FOR TRANSCEIVING SIGNALS USING DIFFERENT COMMUNICATION PROTOCOLS

BACKGROUND OF THE INVENTION

1. Field of the Invention

The present invention relates to a signal transponder, and more particularly to a signal transponder transceiving signals using different wireless communication protocols for tire pressure monitoring.

2. Description of the Related Art

Current wireless tire pressure monitoring system (TPMS) provides a tire pressure sensor to each of the tires of a vehicle. After each tire pressure sensor detects a tire pressure of a corresponding tire and wirelessly transmits the detected signal to a tire pressure receiver inside the vehicle, the tire pressure receiver wirelessly receives the detected signals of all tire pressure sensors to determine if the tire pressure of each tire is normal. If the detected signal of any tire pressure sensor is abnormal, the tire pressure receiver then generates a sound alert or a visual alert to prompt users for abnormal tire pressure condition.

As the tire pressure sensors and the tire pressure receiver need to have an identical communication protocol for the tire pressure signals to be successfully transmitted and received between each tire pressure sensor and the tire pressure receiver, the tire pressure detected by each tire pressure sensor is encoded according to a configured communication protocol and the tire pressure receiver decodes the encoded tire pressure value according to the configured communication protocol after wirelessly receiving the encoded tire pressure signal. Should any tire pressure sensor or the tire pressure receiver is faulty, the faulty tire pressure sensor or the tire pressure receiver should be replaced with a good counterpart having the same communication protocol therein to ensure continuous operation. However, if the tire pressure sensor or the tire pressure receiver with the same model number is out of stock or is no longer supplied, using the tire pressure sensor or the tire pressure receiver having different communication protocol may cause failure in decoding the tire pressure signals. Entire TPMS may have to be replaced sometimes and operational inconvenience and cost increase is caused accordingly.

SUMMARY OF THE INVENTION

An objective of the present invention is to provide a signal transponder transceiving signals using different wireless communication protocols and a method for transceiving signals using different wireless communication protocols introducing no operational inconvenience out of decoding and transmission errors and cost increase because of the use of signal transponder in communication with existing tire pressure sensors and tire pressure receiver using different communication protocols.

To achieve the foregoing objective, the signal transponder transceiving signals using different communication protocols has a receiving module, a control module and a transmitting module.

The receiving module receives multiple external tire pressure signals.

The control module is electrically connected to the receiving module, has multiple communication protocols, decodes each tire pressure signal with one of the communication protocols, and encodes decoded information contained in the tire pressure signal with another communication protocol to generate a new tire pressure signal.

The transmitting module is electrically connected to the control module and transmits the new tire pressure signal out.

To achieve the foregoing objective, the method for transceiving signals using different wireless communication protocols is performed by a control module of a signal transponder mounted in a vehicle. The control module stores multiple communication protocols. The method has steps of:

receiving an external tire pressure signal encoded with a communication protocol;

selecting one of the communication protocols stored in the control module to correspond to the communication protocol used to encode the external tire pressure signal and decoding the external tire pressure signal with the selected communication protocol to acquire at least one tire status parameter; and encoding the at least one tire status parameter with another one of the communication protocols stored in the control module to generate a new tire pressure signal and transmitting the new tire pressure signal out.

Given the foregoing signal transponder transceiving signals using different communication protocols, the control module of the signal transponder is built in with multiple communication protocols, is capable of receiving tire pressure signals transmitted from tire pressure sensors built in with different communication protocols, decodes each tire pressure signal with the communication protocol built in a corresponding tire pressure sensor to acquire tire status information contained in the tire pressure signal, and encodes the tire status information with a communication protocol consistent with that built in the tire pressure receiver, so as to perform data conversion of the tire pressure signal between different communication protocols built in each tire pressure sensor and the tire pressure receiver. Accordingly, operational inconvenience out of errors in data conversion between different communication protocols and cost increase arising from the use of signal transponder in communication with existing tire pressure sensors and tire pressure receiver using different communication protocols can be resolved.

Other objectives, advantages and novel features of the invention will become more apparent from the following detailed description when taken in conjunction with the accompanying drawings.

DETAILED DESCRIPTION OF THE INVENTION

Figure 1:
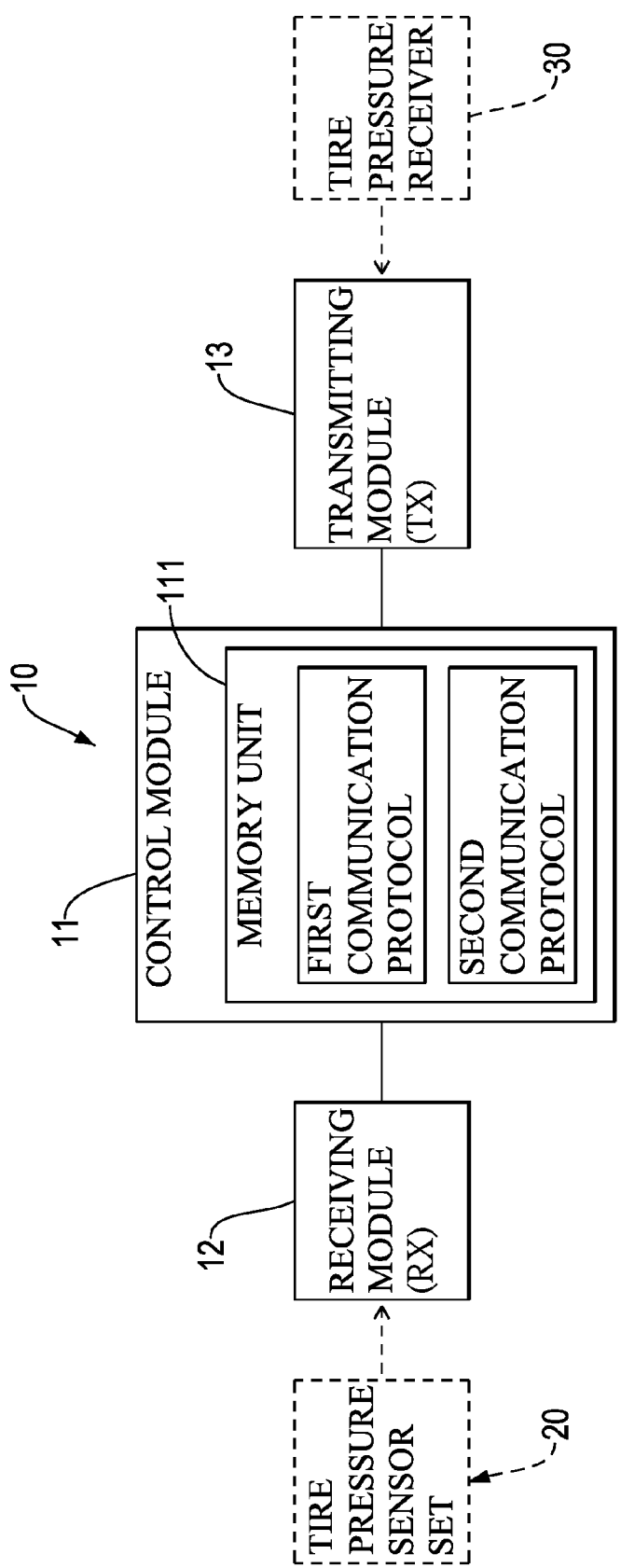
FIG. 1 is a functional block diagram of a signal transponder in accordance with the present invention.

With reference to FIG. 1, a signal transponder 10 in accordance with the present invention has a receiving module 12, a control module 11 and a transmitting module 13. The receiving module 12 wirelessly receives a tire pressure signal encoded by an external tire pressure sensor set 20 built with a first communication protocol and wirelessly transmitted from the external tire pressure sensor set 20. The tire pressure sensor set 20 includes multiple tire pressure sensors. The control module 11 is electrically connected to the receiving module 12 and converts a data format of the received tire pressure signal from the first communication protocol to a second communication protocol. The transmitting module 13 is electrically connected to the control module 11 and wirelessly transmits the tire pressure signal encoded by the control module 11 with the second communication protocol to an external tire pressure receiver 30. Each of the tire pressure sensor set 20 and the tire pressure receiver 30 is built in with and complies with the first communication protocol and the second communication protocol respectively.

The tire pressure sensor set 20 is mounted in all tires of a vehicle to detect temperature, pressure and/or acceleration of each tire, encodes the detected temperature, pressure and/or acceleration into a tire pressure signal according to a format of the first communication protocol, and wirelessly transmits the tire pressure signal to the receiving module 12. The control module 11 has a memory unit 111. The memory unit stores multiple communication protocols, including the first communication protocol and the second communication protocol that is different from the first communication protocol. The first communication protocol or the second communication protocol is manually selected or the control module 11 automatically determines if the data format of the tire pressure signal received by the receiving module 12 complies with the selected communication protocol. When determining that the data format of the tire pressure signal complies with the selected communication protocol, the control module 11 decodes the tire pressure signal according to the manually selected or automatically determined communication protocol to acquire identification number (ID), temperature, pressure and/or acceleration contained in the tire pressure signal from a corresponding tire. Suppose that each tire pressure sensor of the tire pressure sensor set 20 encodes the tire pressure signal according to the first communication protocol. After identifying the data format of the tire pressure signal in compliance with the first communication protocol, the control module 11 then decodes the tire pressure signal according to the first communication protocol to acquire ID, temperature, pressure and/or acceleration in the tire pressure signal, encodes the ID, temperature, pressure and/or acceleration to generate a new tire pressure signal according to another communication protocol, such as the second communication protocol, with which the tire pressure receiver 30 is built in and complies, and transmits the new tire pressure signal to the tire pressure receiver 30 through the transmitting module 13.

As the first communication protocol differs from the second communication protocol, examples of data formats of the first communication protocol and the second communication protocol include, but are not limited to, the following tables.

First Communication Protocol:

| ID | Temperature | Pressure | Acceleration | CRC |
|---|---|---|---|---|

Second Communication Protocol:

| ID | Pressure | Temperature | Blank | CRC |
|---|---|---|---|---|

In view of difference of data formats between the first communication protocol and the second communication protocol, the control module 11 decodes the tire pressure signal using the first communication protocol to acquire the ID, temperature, pressure, acceleration and CRC (Cyclic Redundancy Check), and the ID, temperature, pressure and CRC is encoded to generate the new tire pressure signal complying with the data format of the second communication protocol. The new tire pressure signal is further transmitted to the tire pressure receiver 30. The tire pressure receiver 30 can thus correctly receive and decode the tire pressure signals transmitted from the tire pressure sensor set 20.

Figure 2:
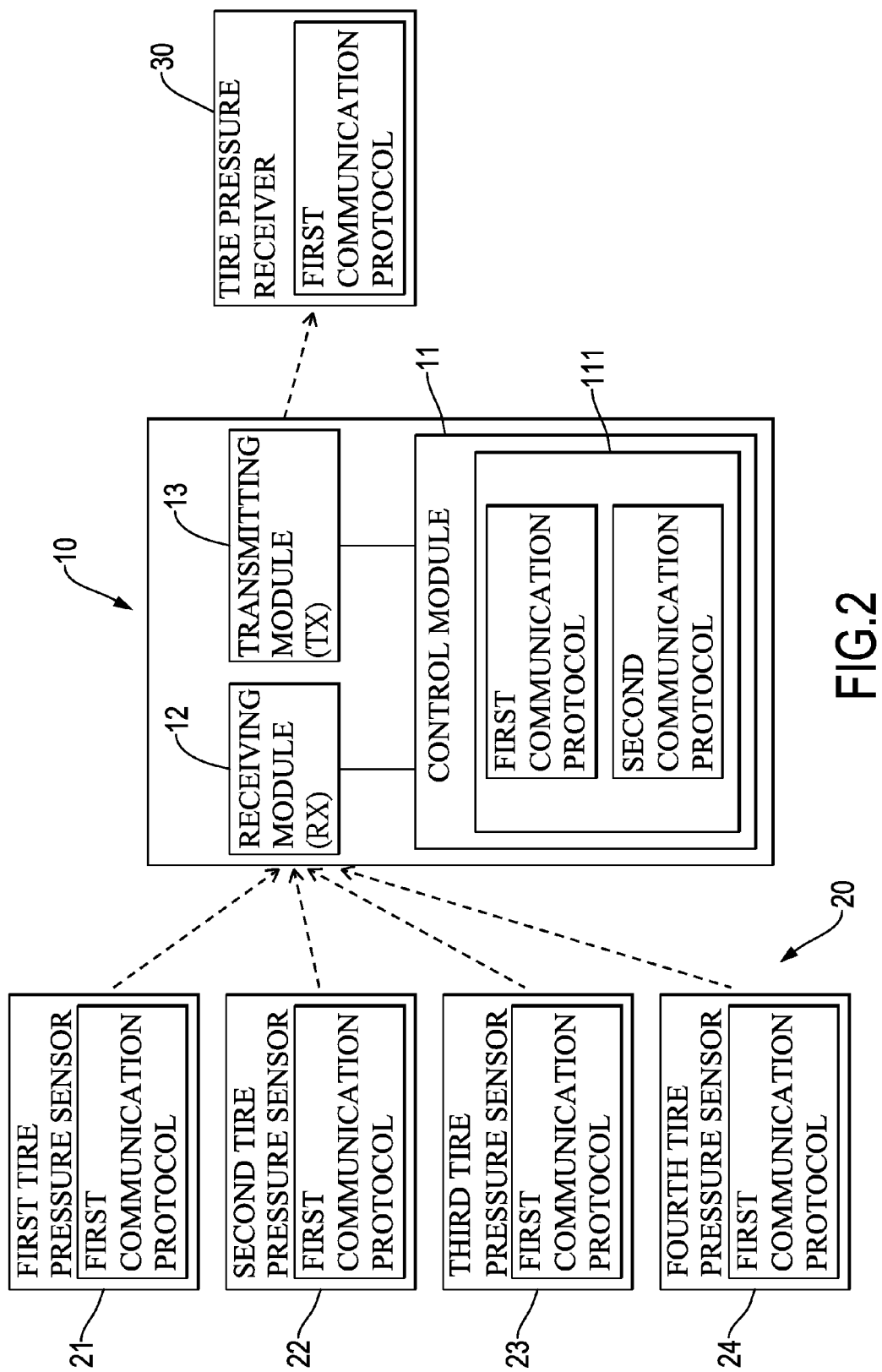
FIG. 2 is a first operational functional diagram of the signal transponder in FIG. 1.

With reference to FIG. 2, the signal transponder is operated in collaboration with the tire pressure sensor set 20 and the tire pressure receiver 30 that are built in with the first communication protocol. The tire pressure sensor set 20 has a first tire pressure sensor 21, a second tire pressure sensor 22, a third tire pressure sensor 23 and a fourth tire pressure sensor 24 respectively mounted on four tires of a vehicle. The tire pressure receiver 30 is mounted inside the vehicle to receive and display the tire pressure values (or temperature) detected by the tire pressure sensor set 20. Each tire pressure sensor is built in with and complies with the first communication protocol, encodes the detected tire pressure value of a corresponding tire using the first communication protocol to generate a tire pressure signal, and wirelessly transmits the tire pressure signal to the signal transponder 10. As the tire pressure receiver 30 is also built in with and complies with the first communication protocol, the signal transponder 10 directly transmits the tire pressure signal to the tire pressure receiver 30. The tire pressure receiver 30 receives the tire pressure signal and then decodes the received tire pressure signal using the first communication protocol to acquire the correct tire pressure value and other information of the corresponding tire.

Figure 3:
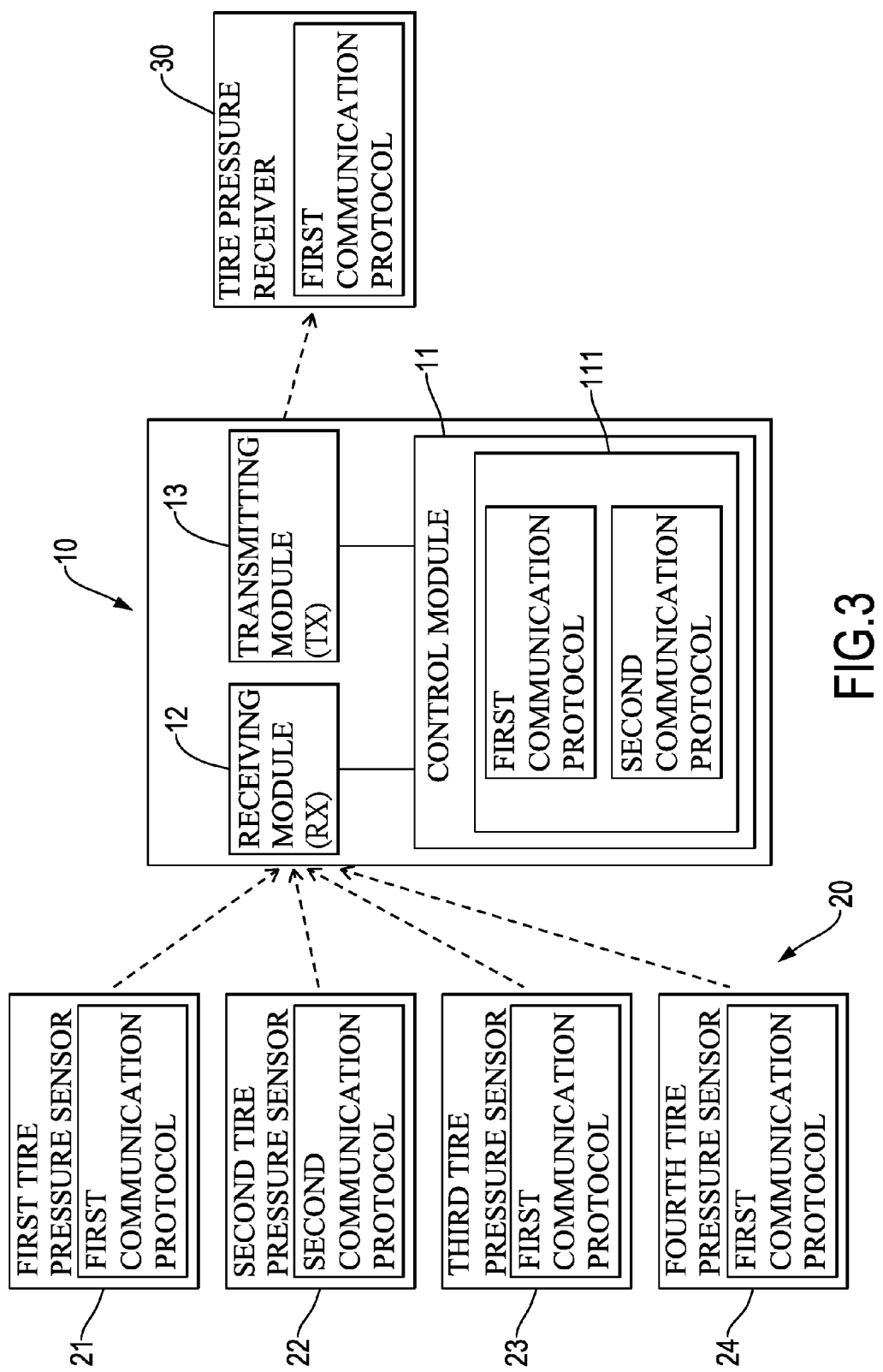
FIG. 3 is a second operational functional diagram of the signal transponder in FIG. 1.

When any tire pressure sensors is built in with and complies with different communication protocol as shown in FIG. 3, the second tire pressure sensor 22 is built in with and complies with the second communication protocol, which is different from the first communication protocol built in other tire pressure sensors 21, 23, 24 and the tire pressure receiver 30. The tire pressure receiver 30 can correctly and directly decode all the tire pressure signals from all the tire pressure sensors 21, 23, 24 with the first communication protocol except from the second tire pressure sensor 22 directly. Given the signal transponder 10, the receiving module 12 of the signal transponder 10 receives the tire pressure signals from all the tire pressure sensors 21~24, and the control module 11 determines if the data format of each tire pressure signal complies with the first communication protocol or the second communication protocol stored in the memory unit 111. As the tire pressure receiver 30 is built in with the first communication protocol, the control module 10 can directly forward the tire pressure signals transmitted from the first tire pressure sensor 21, the third tire pressure sensor 23 and the fourth tire pressure sensor 24 to the tire pressure receiver 30 without having to decode the tire pressure signals and then encode the decoded information with the first communication protocol as those tire pressure signals are already encoded with the first communication protocol. On the other hand, the tire pressure signal transmitted from the second tire pressure sensor 22 and having the data format in compliance with the second communication protocol is decoded with the second communication protocol and is further encoded with the first communication protocol to generate a new tire pressure signal. The transmitting module 13 of the signal transponder 10 transmits the new tire pressure signal to the tire pressure receiver 30 such that the tire pressure receiver 30 can therefore correctly decode the tire pressure signals transmitted from the second tire pressure sensor 22 and other tire pressure sensors 21, 23, 24.

Figure 4:
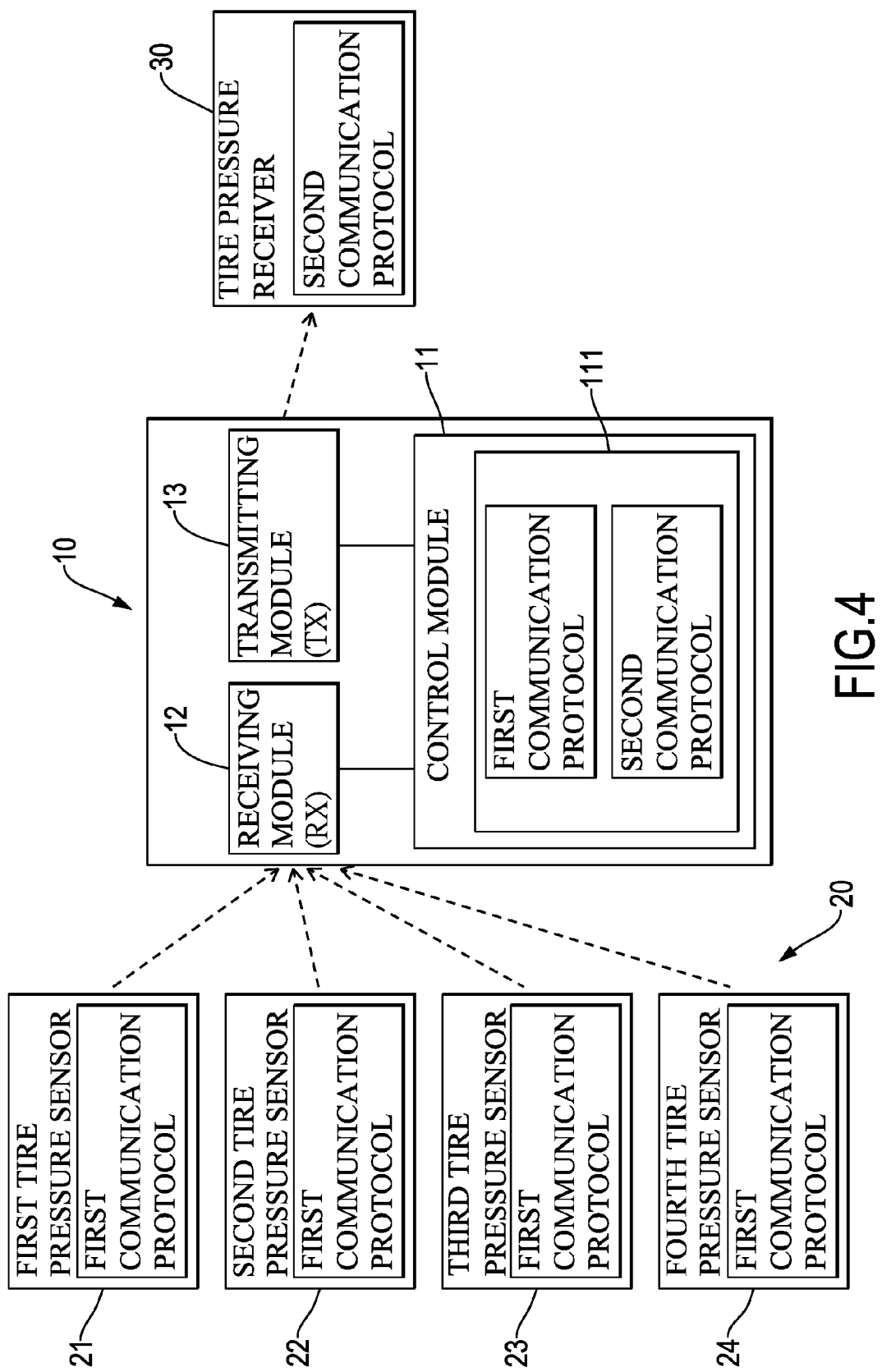
FIG. 4 is a third operational functional diagram of the signal transponder in FIG. 1.

With reference to FIG. 4, when the tire pressure receiver 30 is built in with and complies with the second communication protocol, which is different from the first communication protocol built in all the tire pressure sensors, the tire pressure receiver 30 fails to correctly and directly decode the tire pressure values detected and encoded by the tire pressure sensors 21~24. Given the signal transponder 10, the control module 11 decodes the tire pressure signal transmitted from the tire pressure sensors 21~24 using the first communication protocol and encodes the decoded tire pressure value and other information contained in the tire pressure signals with the second communication protocol to generate a new tire pressure signal. The transmitting module 13 further transmits the new tire pressure signal to the tire pressure receiver 30 such that the new tire pressure signal can be received and correctly decoded by the tire pressure receiver 30 using the second communication protocol.

The communication protocol configured in the signal transponder 10 in response to the communication protocol built in each tire pressure sensor or the tire pressure receiver 30 can be set up by the following means.

1. Manual means: The communication protocol in the signal transponder 10 can be configured through a manual input of an external signal or of a switch such that the control module 11 can configure the communication protocol common to that in each tire pressure sensors 21~24 or that in the tire pressure receiver 30 according to the manual input.

2. Automatic means: The control module 11 automatically checks if the data format of a received tire pressure signal transmitted from one of the tire pressure sensors complies with any communication protocol stored in the memory unit 111 to identify a matching communication protocol, decodes the tire pressure signal according to the identified communication protocol, encodes the decoded tire pressure value and other information contained in the tire pressure signal using another communication protocol built in the control module 11 and being common to the manually inputted communication protocol of the tire pressure receiver 30 to generate a new tire pressure signal, and transmits the new tire pressure signal to the tire pressure receiver 30.

Figure 5:
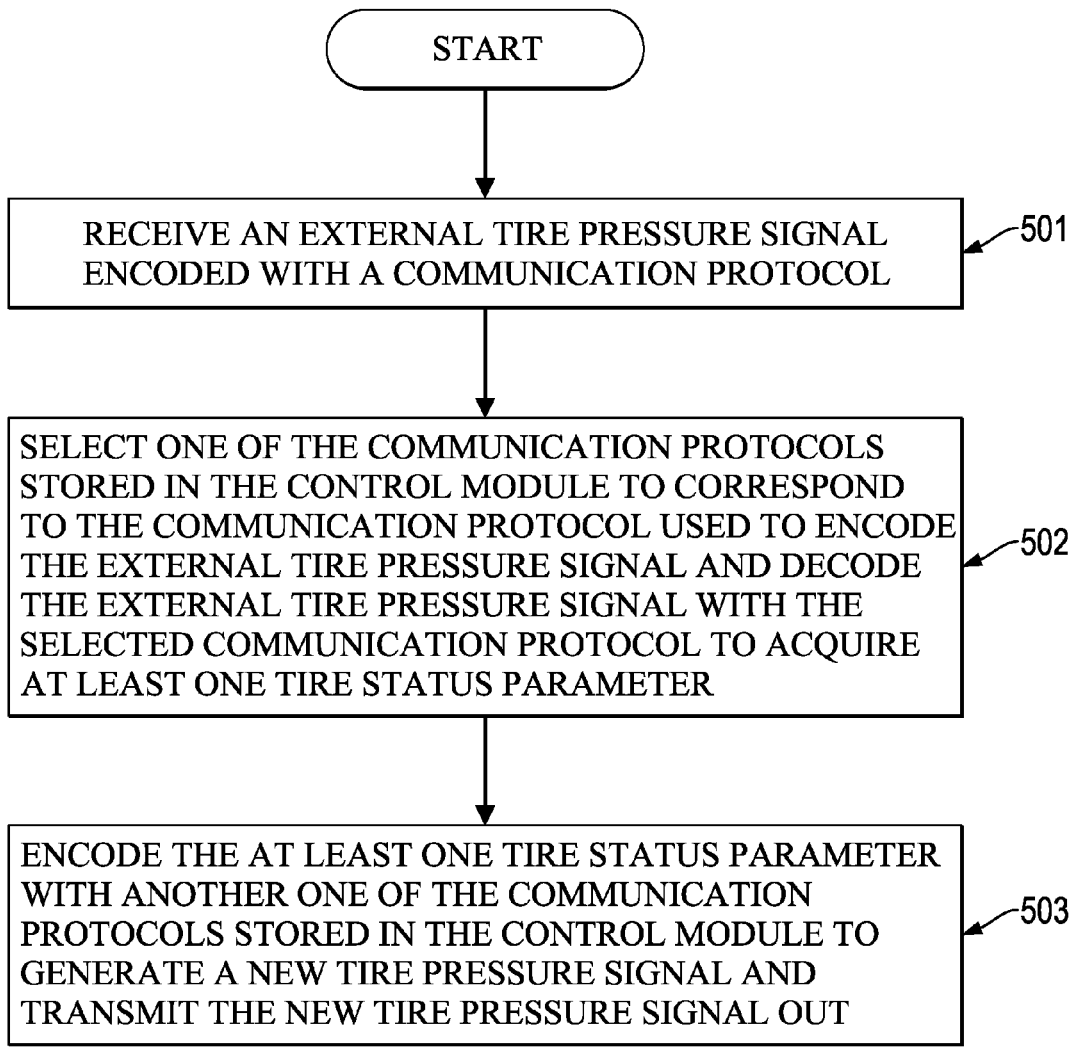
FIG. 5 is a flow diagram of a method for transceiving signals using different communication protocols in accordance with the present invention.

With reference to FIG. 5, a method for transceiving signals using different communication protocols is performed by a control module of a signal transponder mounted on an appropriate location inside a vehicle. The control module stores multiple communication protocols. The method has the following steps.

Step 501: Receive an external tire pressure signal encoded with a communication protocol.

Step 502: Select one of the communication protocols stored in the control module to correspond to the communication protocol used to encode the external tire pressure signal and decode the external tire pressure signal with the selected communication protocol to acquire at least one tire status parameter.

Step 503: Encode the at least one tire status parameter with another one of the communication protocols stored in the control module to generate a new tire pressure signal and transmit the new tire pressure signal out.

The communication protocols stored in the control module include a first communication protocol and a second communication protocol. The second communication protocol differs from the first communication protocol.

The external tire pressure signal is transmitted from a tire pressure sensor. The first communication protocol is built in the tire pressure sensor. The new tire pressure signal is adapted to be transmitted to a tire pressure receiver, and the second communication protocol is built in the tire pressure receiver.

From the foregoing, the signal transponder 10 is built in with multiple communication protocols adaptively corresponding to the communication protocol built in each tire pressure sensor and the tire pressure receiver 30 to decode the tire pressure signal from each tire pressure sensor using one communication protocol and encode the decoded information to generate a new tire pressure signal using another communication protocol and further transmit the new tire pressure signal to the tire pressure receiver 30 for the tire pressure receiver 30 to correctly decode the new tire pressure signal. Accordingly, there is no operational inconvenience out of decoding and transmission errors and cost increase because of the use of signal transponder in communication with existing tire pressure sensors and tire pressure receiver using different communication protocols.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A signal transponder transceiving signals using different communication protocols, comprising:
    a receiving module adapted to receive multiple external tire pressure signals respectively transmitted from multiple tire pressure sensors;
    a control module electrically connected to the receiving module, having a memory unit storing multiple communication protocols, decoding each tire pressure signal with one of the communication protocols, and encoding decoded information contained in the tire pressure signal with another communication protocol to generate a new tire pressure signal; and
    a transmitting module electrically connected to the control module and adapted to wirelessly transmit the new tire pressure signal to an external tire pressure receiver.

2. The signal transponder as claimed in claim 1, wherein the memory unit is built in with a first communication protocol and a second communication protocol different from the first communication protocol.

3. The signal transponder as claimed in claim 2, wherein the external tire pressure signals are adapted to be transmitted from multiple tire pressure sensors, the first communication protocol is adapted to be built in each tire pressure sensor, the new tire pressure signals are adapted to be transmitted to a tire pressure receiver, and the second communication protocol is built in the tire pressure receiver.

4. The signal transponder as claimed in claim 2, wherein the first communication protocol or the second communication protocol built in the memory unit of the control module is configured by a manual means or an automatic means.

5. The signal transponder as claimed in claim 3, wherein the first communication protocol or the second communication protocol built in the memory unit of the control module is configured by a manual means or an automatic means.

6. The signal transponder as claimed in claim 4, wherein the first communication protocol or the second communication protocol built in the control module is manually configured to correspond to the first communication protocol in the tire pressure sensors or the second communication protocol in the tire pressure receiver according to input of an external signal or input of a switch.

7. The signal transponder as claimed in claim 5, wherein the first communication protocol or the second communication protocol built in the control module is manually configured to correspond to the first communication protocol in the tire pressure sensors or the second communication protocol in the tire pressure receiver according to input of an external signal or input of a switch.

8. The signal transponder as claimed in claim 4, wherein the control module automatically identifies one of the first communication protocol and the second communication protocol stored in the memory unit and complying with a data format of each external tire pressure signal transmitted from a corresponding tire pressure sensor for decoding the external tire pressure signal.

9. The signal transponder as claimed in claim 5, wherein the control module automatically identifies one of the first communication protocol and the second communication protocol stored in the memory unit and complying with a data format of each external tire pressure signal transmitted from a corresponding tire pressure sensor for decoding the external tire pressure signal.

10. The signal transponder as claimed in claim 6, wherein the control module automatically identifies one of the first communication protocol and the second communication protocol stored in the memory unit and complying with a data format of each external tire pressure signal transmitted from a corresponding tire pressure sensor for decoding the external tire pressure signal.

11. The signal transponder as claimed in claim 7, wherein the control module automatically identifies one of the first communication protocol and the second communication protocol stored in the memory unit and complying with a data format of each external tire pressure signal transmitted from a corresponding tire pressure sensor for decoding the external tire pressure signal.

12. A method for transceiving signals using different communication protocols performed by a control module of a signal transponder that is between multiple external tire pressure sensors and an external tire pressure receiver mounted in a vehicle and storing multiple communication protocols, the method comprising steps of:
   receiving an external tire pressure signal encoded with a communication protocol;
   selecting one of the communication protocols stored in the control module to correspond to the communication protocol used to encode the external tire pressure signal and decoding the external tire pressure signal with the selected communication protocol to acquire at least one tire status parameter; and
   encoding the at least one tire status parameter with another one of the communication protocols stored in the control module to generate a new tire pressure signal and transmitting the new tire pressure signal out.

13. The method as claimed in claim 12, wherein the communication protocols stored in the control module include a first communication protocol and a second communication protocol, and the second communication protocol differs from the first communication protocol.

14. The method as claimed in claim 13, wherein the external tire pressure signal is adapted to be transmitted from the tire pressure sensor, the first communication protocol is adapted to be built in the tire pressure sensor, the new tire pressure signal is adapted to be transmitted to a tire pressure receiver, and the second communication protocol is built in the tire pressure receiver.

* * * * *